United States Patent
Tseng et al.

(10) Patent No.: US 10,419,989 B2
(45) Date of Patent: Sep. 17, 2019

(54) DIRECT LINK MODE FOR SMALL CELLS OF CELLULAR WIRELESS COMMUNICATION NETWORKS

(71) Applicant: Taiwan Semiconductor Manufacturing Company, Ltd., Hsinchu (TW)

(72) Inventors: Yung-Lan Tseng, Taiwan (CN); Ching-Yao Huang, Taiwan (CN)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 135 days.

(21) Appl. No.: 14/330,504

(22) Filed: Jul. 14, 2014

(65) Prior Publication Data

US 2015/0105085 A1 Apr. 16, 2015

Related U.S. Application Data

(60) Provisional application No. 61/891,860, filed on Oct. 16, 2013.

(51) Int. Cl.
| | | |
|---|---|---|
| *H04W 36/04* | (2009.01) | |
| *H04W 84/00* | (2009.01) | |
| *H04W 84/04* | (2009.01) | |

(52) U.S. Cl.
CPC ............ *H04W 36/04* (2013.01); *H04W 84/00* (2013.01); *H04W 84/045* (2013.01)

(58) Field of Classification Search
CPC .............. H04W 84/045; H04W 48/16; H04W 36/0055; H04W 36/0061; H04W 36/04; H04W 24/02; H04W 36/0083
See application file for complete search history.

(56) References Cited

U.S. PATENT DOCUMENTS

| | | | | |
|---|---|---|---|---|
| 2009/0163216 A1* | 6/2009 | Hoang | ............... | H04W 36/0055 455/450 |
| 2010/0054145 A1* | 3/2010 | Frenger | ............... | H04W 72/085 370/252 |
| 2010/0329206 A1* | 12/2010 | Thome | ................ | H04W 76/046 370/331 |
| 2011/0051640 A1* | 3/2011 | Ramesh | ................ | H04W 48/14 370/311 |
| 2011/0053604 A1* | 3/2011 | Kim | ....................... | H04W 16/16 455/450 |
| 2011/0086636 A1* | 4/2011 | Lin | ......................... | H04W 24/02 455/434 |
| 2011/0275361 A1* | 11/2011 | Yavuz | ................. | H04W 52/143 455/422.1 |
| 2011/0294508 A1* | 12/2011 | Min | ................... | H04W 36/0083 455/436 |
| 2013/0003680 A1* | 1/2013 | Yamamoto | ............ | G01S 5/0205 370/329 |
| 2014/0128078 A1* | 5/2014 | Zhu | ................... | H04W 52/0206 455/437 |
| 2015/0271743 A1* | 9/2015 | Teng | ...................... | H04W 48/16 455/452.1 |

* cited by examiner

*Primary Examiner* — Ernest G Tacsik
(74) *Attorney, Agent, or Firm* — Haynes and Boone, LLP

(57) ABSTRACT

This disclosure generally relates to facilitation of a small cell device to detect direct link opportunities to establish a direct link mode connection to a user equipment based upon monitoring uplink communications from the user equipment to a macro base station, and cooperating with the macro base station to establish a direct link with the user equipment.

25 Claims, 12 Drawing Sheets

DIRECT LINK MODE FOR SMALL CELLS OF CELLULAR WIRELESS COMMUNICATION NETWORKS

CROSS REFERENCE TO RELATED APPLICATION AND CLAIM OF PRIORITY

This application is a non-provisional of, and claims priority to, U.S. Provisional Patent Application No. 61/891,860, filed Oct. 16, 2013, and titled "Direct Link Mode for Small Cells of Cellular Wireless Communication Networks", which is incorporated herein by reference in its entirety.

TECHNICAL FIELD

This disclosure generally relates to facilitating a small cell device to detect direct link opportunities to establish a direct link mode connection to a user equipment based upon monitoring uplink communications from the user equipment to a macro base station, and cooperating with the macro base station to establish a direct link with the user equipment.

BACKGROUND

Advanced cellular communication networks (e.g. 4G Long Term Evolution) allow for deployment of small cell devices (e.g., microcell device, picocell device, femtocell device) that operate in a similar manner to a macro base station (e.g. high powered cellular base station or tower), but with a small cell coverage area that is less than a macro cell coverage area of the macro base station.

Referring to FIG. 1, is depicted a cellular communication network in which small cell devices 130A, 130B, and 130C, having respective small cell coverage areas 135A, 135B, and 135C, are deployed within macro cell coverage area 120 of a macro base station 110. Small cell devices 130A, 130B, and 130C can communicate with user equipment 140A, 140B, and 140C wirelessly. Small cell devices 130A, 130B, and 130C can communicate with macro base station 110 wirelessly or through wired connection 150 (e.g. backhaul connection).

It is to be appreciated that a small cell device can have different, less, or more operation states than a macro base station. Thus, it is possible for a small cell device to attain additional flexibility over a macro base station.

Referring to FIG. 2 is a non-limiting example of operation states of a small cell device (e.g. femto base station). In radiation power on/off state 210, small cell device can control radio frequency components to turn ON or OFF radiation power on one or more frequencies. In initialization state 220, such as transitioning from radiation power on/off state 210, small cell device can determine operational parameters for communication on the cellular communication network, such as in a non-limiting example, frequency subcarriers (e.g. channels) to employ and radiation power level for its radio antennae. In operational state 230, such as transitioning from initialization state 220, small cell device can operate in two modes, normal operation mode 240 and low duty mode 250. In normal operation mode 240, small cell device operates as a macro base station with a smaller cell coverage area. In low duty mode 250, small cell device turns off or reduces radiation power of its radio antennae periodically or aperiodically to decrease interference with neighboring small cell devices or macro base stations, where available interval state 260 does not have the radiation power reduced or turned off, and unavailable interval state 270 has the radiation power reduced or turned off. It is to be appreciated that small cell device can transition between states and modes as needed according to any suitable criteria or algorithm.

The deployment of a vast number of small devices can introduce several potential problems for the cellular communication networks. For example, interference can be an issue. In some cellular communication networks, all base stations (e.g., macro and small cell) broadcast system information within a fixed set of frequency subcarriers of a signal (e.g., orthogonal frequency division multiplexing). As such neighboring base stations can cause mutual interference on the set of subcarriers used for broadcasting system information. In another example, increased usage of limited bandwidth for transmitting control information can create inefficiencies. As a small cell generally services only a few user equipment, periodically broadcasting control information increases the bandwidth usage overhead per user equipment. As an additional example, inefficient usage of sub-frames in the downlink/uplink scheduling can also be an issue. The basic unit of downlink/uplink scheduling is per sub-frame. There is an increased possibility that a small cell device serves one or a low number of user equipment, therefore occupying an entire sub-frame in the downlink/uplink scheduling for the one or low number of user equipment.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a small cell device determines an opportunity to connect with a user equipment using a direct link mode by monitoring uplink radio frames from the user equipment to a macro base station device, and in response to identifying the opportunity to connect with the user equipment using the direct link mode, notifies the macro base station device of the opportunity to connect with the user equipment using the direct link mode, receives direct link information for the user equipment from the macro base station device, and establishes a direct link with the user equipment based on the direct link information.

In accordance with a non-limiting implementation, a listening component is configured to identify a direct link mode opportunity with a user equipment by monitoring uplink radio frames of a macro base station device, and a direct link mode component is configured to, in response to identification of the direct link mode opportunity with the user equipment, notify the macro base station device of the direct link mode opportunity with the user equipment, receive direct link information for the user equipment from the macro base station device, and establish a direct link with the user equipment.

These and other implementations and embodiments are described in more detail below.

DETAILED DESCRIPTION

Overview

Figure 1:
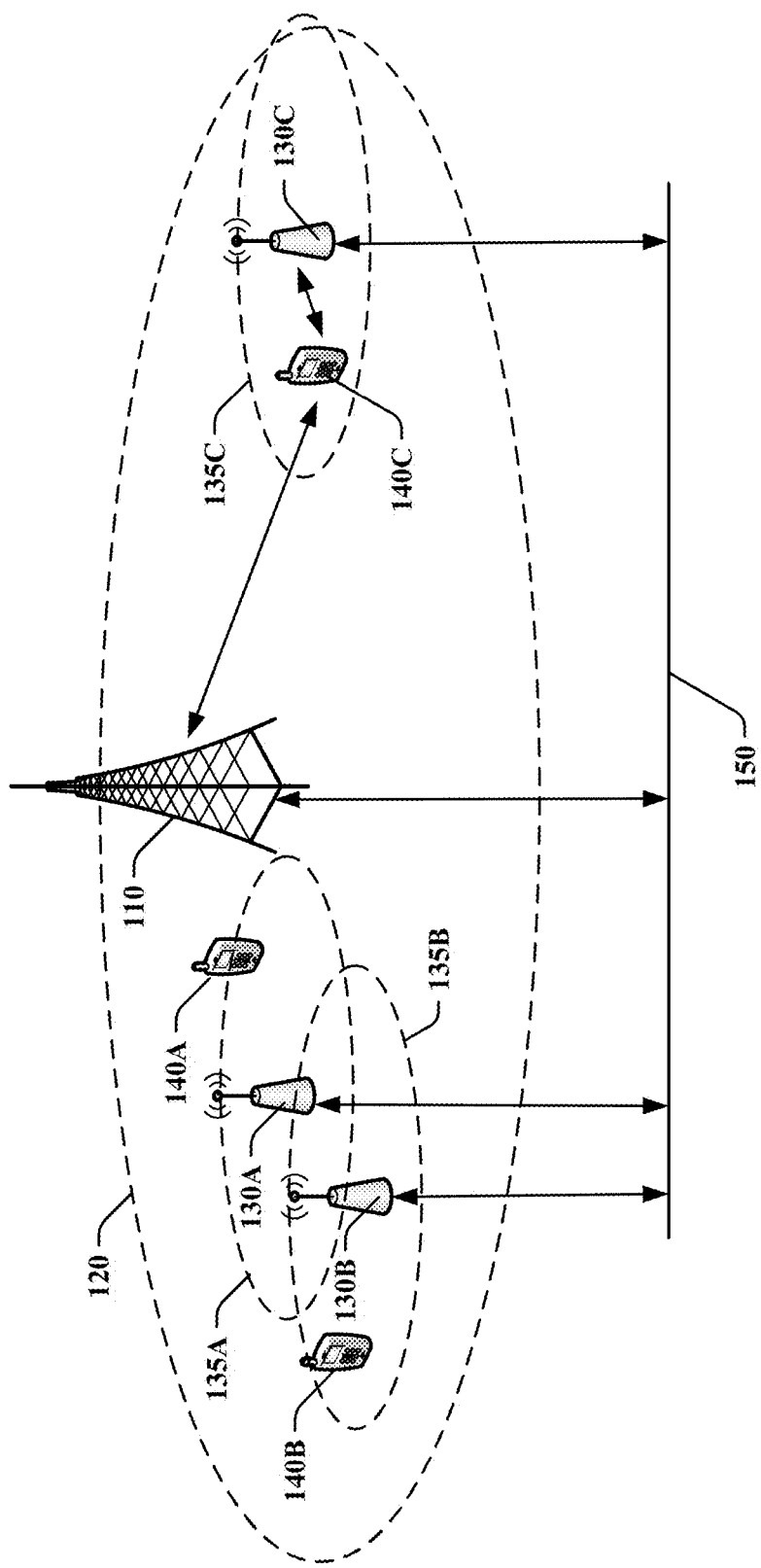
FIG. 1 illustrates a diagram of an exemplary non-limiting example cellular communication network in which small cell devices, having respective small cell coverage areas, are deployed within macro cell coverage area of a macro base station.
Figure 2:
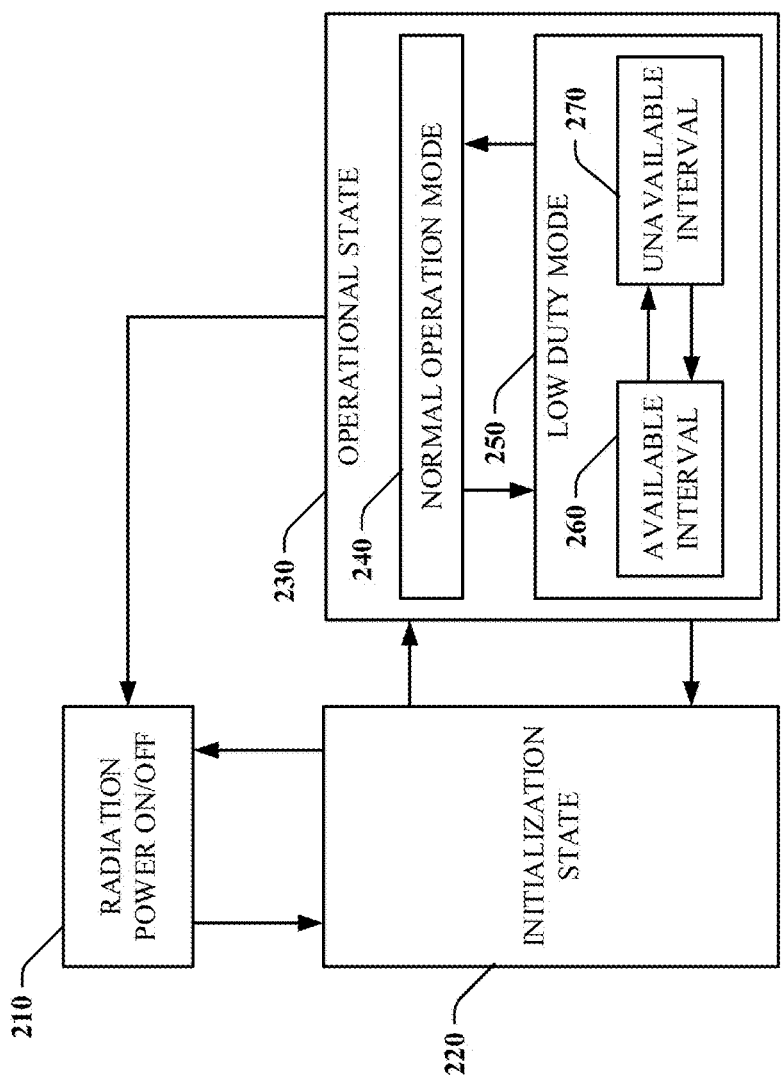
FIG. 2 illustrates a block diagram of exemplary non-limiting conventional states of a small cell device (e.g. femto base station).

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In accordance with various disclosed aspects, a mechanism is provided for a small cell device to monitor uplink communications from one or more user equipment to a macro base station to identify a direct link opportunity to establish a direct link mode connection with a user equipment, and upon identifying the direct link opportunity, cooperating with the macro base station to establish a direct link with the user equipment.

It is to be appreciated that the herein embodiments are applicable to any suitable communication protocol, non-limiting example of which include IEEE 802.11 a\b\g\n\ac, Global System for Mobile Communications (GSM), Code division multiple access (CDMA), Time division multiple access (TDMA), Bluetooth, Near field communication (NFC), General packet radio service (GPRS), Universal Mobile Telecommunications System (UMTS), Long Term Evolution (LTE), Enhanced Data rates for GSM Evolution (EDGE), Wideband Code Division Multiple Access (W-CDMA), Time Division Synchronous Code Division Multiple Access (TD-SCDMA), Worldwide Interoperability for Microwave Access (WiMAX), Long Term Evolution Advanced (E-UTRA), Evolved High-Speed Packet Access, Universal Mobile Telecommunications System-frequency-division duplexing (UMTS-FDD), Universal Mobile Telecommunications System-time-division duplexing (UMTS-TDD), High Speed Packet Access (HSPA), Evolved High-Speed Packet Access (HSPA+), Enhanced Voice-Data Optimized (EVDO), Mobile Broadband Wireless Access (MBWA), High Capacity Spatial Division Multiple Access (HC-SDMA), infrared, lightwave or optical based standard, or any other suitable wireless communication standard.

Figure 3:
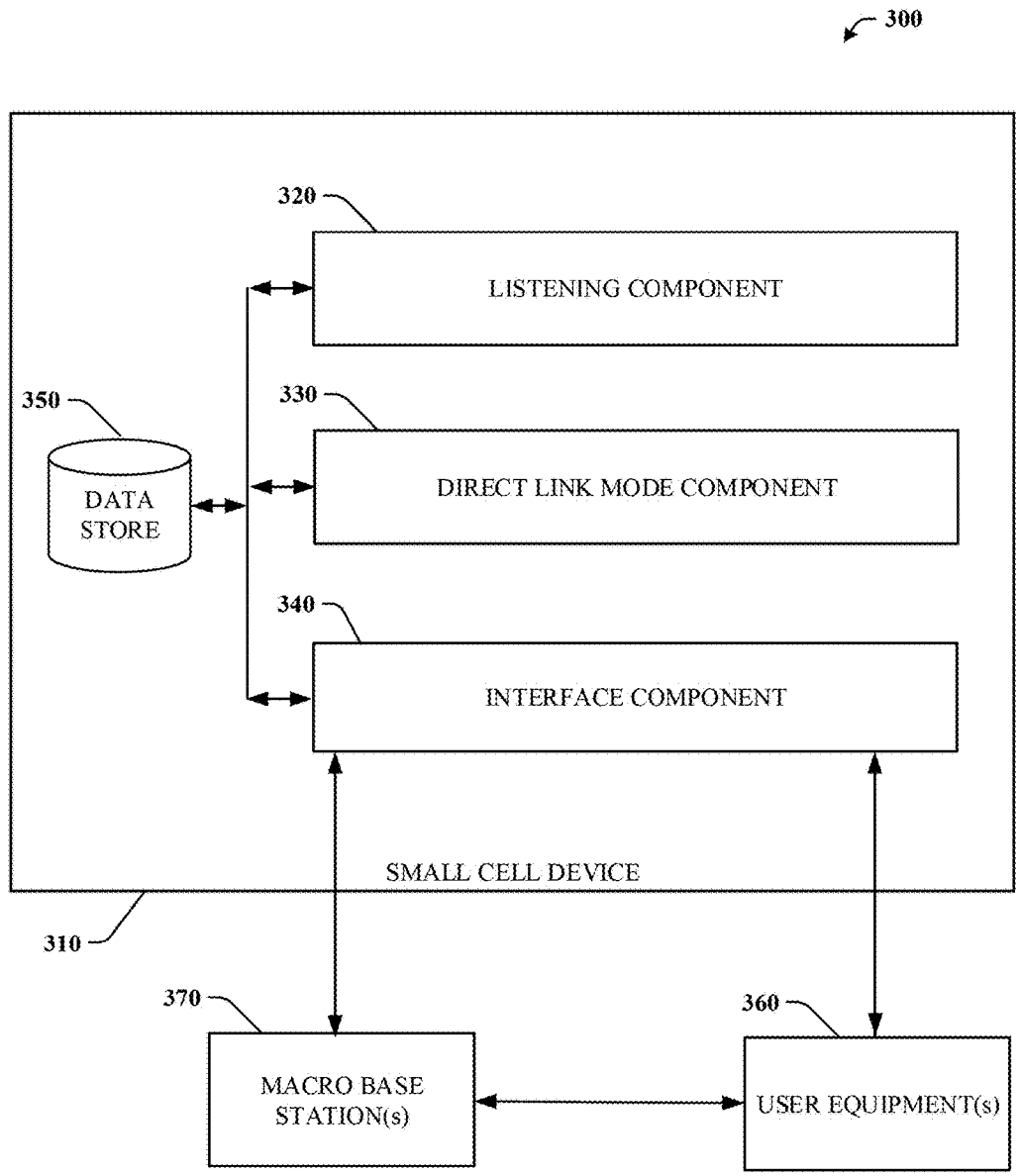
FIG. 3 illustrates a block diagram of an exemplary non-limiting system for establishing direct link mode communication between a small cell device and a user equipment, in cooperation with a macro base station in accordance with an implementation of this disclosure.

Referring now to the drawings, FIG. 3 depicts a system 300 for establishing direct link mode communication between a small cell device 310 and user equipment 360, in cooperation with macro base station 370. System 300 includes small device 310 that includes a listening component 320 that identify a direct link mode opportunity with a user equipment 360 by monitoring uplink radio frames of macro base station 370. Small cell device 310 also includes direct link mode component 330 that cooperates with mode macro base station 370 to employ a direct link mode to establish a direct link with user equipment 360. In addition, small cell device 310 includes interface component 340 that interacts with user equipment 360 and macro base station 370 to facilitate exchange of data. Additionally, small cell device 310 includes a data store 350 that can store data generated and received by small cell device 310, listening component 320, direct link mode component 330, and interface component 340. Data store 350 can be stored on any suitable type of storage device, non-limiting examples of which are illustrated with reference to FIGS. 11 and 12.

While only one user equipment 360 and macro base station 370 are shown, it is to be understood that small cell device 310 can concurrently interact with any suitable number of user equipment 360 and macro base stations 370. In addition, macro base stations 370 can interact with any suitable number of user equipment 360 and small cell devices 310 concurrently. Furthermore, user equipment 360 can interact with any suitable number of macro base stations 370 and small cell devices 310 concurrently. Small cell device 310, user equipment 360, and macro base station 370 respectively include at least one memory that stores computer executable components and at least one processor that executes the computer executable components stored in the memory, a non-limiting example of which can be found with reference to FIG. 12. Small cell device 310 can communicate via a wireless network with user equipment 360 and via a wired and/or wireless network with macro base station 370, and user equipment 360 communicate via a wireless network with macro base station 370.

User equipment 360 can be any suitable type of device for recording, interacting with, receiving, accessing, or supplying data locally, or remotely over a wireless communication link, non-limiting examples of include a wearable device or a non-wearable device. Wearable device can include, for example, heads-up display glasses, a monocle, eyeglasses, contact lens, sunglasses, a headset, a visor, a cap, a helmet, a mask, a headband, clothing, camera, video camera, or any other suitable device capable of recording, interacting with, receiving, accessing, or supplying data that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, Blu-ray device, DVD (digital versatile disc or digital video disc) device, compact disc device, video game system, portable video game console, audio/video receiver, radio device, portable music player, navigation system, car stereo, motion sensor, infrared sensor, or any other suitable device capable of recording, interacting with, receiving, accessing, or supplying data. Moreover, Small cell device 310, user equipment 360, and macro base station 370 can include a user interface (e.g., a web browser or application), that can receive and present displays and data generated locally or remotely.

Continuing with reference to FIG. 3, listening component 320 monitoring uplink radio frames of macro base station 370, such as from a plurality of user equipment 360 to detect a direct link opportunity between the small cell device 310 and a user equipment 360. Listening component 320 can monitor the uplink radio frames on one or more signals, such as in a non-limiting example, an uplink data channel between macro base station 370 and a user equipment 360, an uplink control channel between macro base station 370 and a user equipment 360, an uplink reference signal associated with a user equipment 360. In an embodiment, listening component 320 can determine that a direct link opportunity exists in the event that a signal strength associated with an uplink radio frame from a user equipment 360 meets a signal strength threshold. It is to be appreciated that the signal strength threshold can be pre-defined, set by a system administrator, or dynamically determined. Listening component 320 can notify direct link mode component 330 that a determination has been made that a direct link opportunity exists with a user equipment 360. Furthermore, listening component 320 can also determine when an existing direct link opportunity associated with a user equipment 360 no longer exists, such as when a signal strength associated with an uplink radio frame from a user equipment 360 to small cell device 310 or macro base station 370 no longer meets the signal strength threshold.

Figure 4:
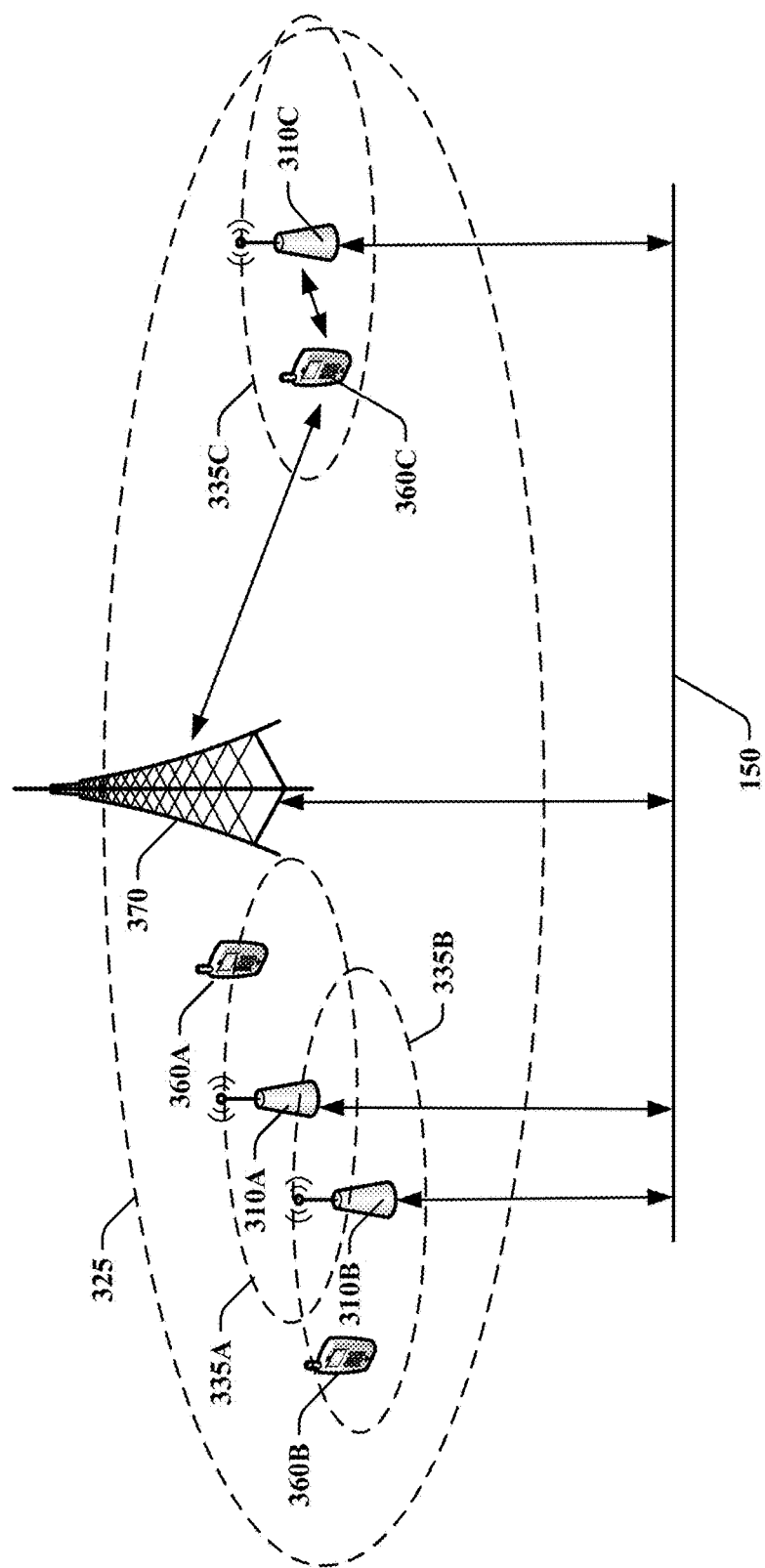
FIG. 4 illustrates a diagram of an exemplary non-limiting cellular communication network in which small cell devices, having respective small cell coverage areas, are deployed within macro cell coverage area of a macro base station in accordance with an implementation of this disclosure.

For example referring to FIG. 4, is depicted a non-limiting example cellular communication network in which small cell devices 310A, 310B, and 310C, having respective small cell coverage areas 335A, 335B, and 335C, are deployed within macro cell coverage area 325 of a macro base station 370. Small cell devices 310A, 310B, and 310C can communicate with user equipment 360A, 360B, and 360C wirelessly. Small cell devices 310A, 310B, and 310C can communicate with macro base station 370 wirelessly or through wired connection 150 (e.g. backhaul connection). Listening component 320 associated with small cell device 310C can identify that a direct mode link opportunity exists with user equipment 360C by monitoring uplink radio frames between user equipment 360C and macro base station 370.

Referring back to FIG. 3, direct link mode component 330 notifies macro base station 370 that a direct mode opportunity exists with a user equipment 360 in response to notification from listening component 320. Referring to the example above with respect FIG. 4, direct link mode component 330 of small cell device 310C would inform macro base station 370 that a direct link mode opportunity exists with user equipment 360C.

Referring to FIG. 3, macro base station 370, in response to receiving notification of the direct mode opportunity exists with user equipment 360, can transmit user equipment identification information associated with user equipment 360 to small cell device 310, and can optionally also transmit small cell device identification information associated with small cell device 310 to user equipment 360. The user equipment identification information allows small cell device 310 to identify user equipment 360. Likewise, the small cell device identification information allows user equipment 360 to identify small cell device 310. Referring again to the example above with respect FIG. 4, macro base station 370 can transmit user equipment identification information associated with user equipment 360C to small cell device 310C, and can optionally also transmit small cell device identification information associated with small cell device 310C to user equipment 360C. The direct link information (e.g. user equipment identification information, and/or small cell device identification information) can be employed by small cell device 310 and/or user equipment 360 to establish a direct link (e.g. small cell device and/or user equipment can participate in the establishment of the direct link).

Macro base station 370 dynamically assigns one or more radio resources (e.g. frequency subcarriers or channels) to small cell device 310 and user equipment 360 in order for a direct link to be established between small cell device 310 and user equipment 360. Advantageously, macro base station 370 can take into account respective geographic locations of small cell devices 310 in order to reuse radio resources. Referring back to FIG. 4, small cell device 310A can employ radio resource A in a direct link with user equipment 360A. Macro base station 370 can determine that small cell device 310A is geographically separated from small cell device 310C by a distance meeting a distance threshold, and can also assign radio resource A to small cell device 310C and user equipment 360C to establish a direct link. However, macro base station 370 can determine that small cell device 310A is not geographically separated from small cell device 310B by a distance meeting a distance threshold, and assign radio resource B to small cell device 310B and user equipment 360B to establish a direct link. It is to be appreciated that the distance threshold can be pre-defined, set by a system administrator, or dynamically determined.

Referring to FIG. 3, macro base station 370 transmits the assignment of the one or more radio resources to small cell device 310 and user equipment 360. It is to be appreciated that the direct link information can include the assignment of the one or more radio resources. Direct mode link component 330 will employ the user equipment identification information and assigned radio resources transmitted from macro base station 370 establish a direct link to user equipment 360 in a direct link mode. For example, direct mode link component 330 can send a request to user equipment 360 to form a direct connection (e.g. link) with small cell device 310. User equipment 310 can establish the direct connection with small cell device 310 in response to receiving the request.

In direct link mode, small cell device 310 does not broadcast control information, and instead sends control information to user equipment 360 in data packets on the direct link established between small cell device 310 and user equipment 360. Advantageously, this can reduce interference with neighboring small cell devices 310 and macro base station 370, reduces bandwidth usage for control information on broadcast frequency sub-carriers, and improves overall efficiency of frequency spectrum usage. One potential downside with a small cell device 310 not broadcasting control information in direct link mode is that other user equipment 360 that are not in a direct link with small cell device 310 will not be able to discover small cell device 310. Therefore, three types of small cell devices 310 can be employed, type I, type II, and type III.

Figure 5:
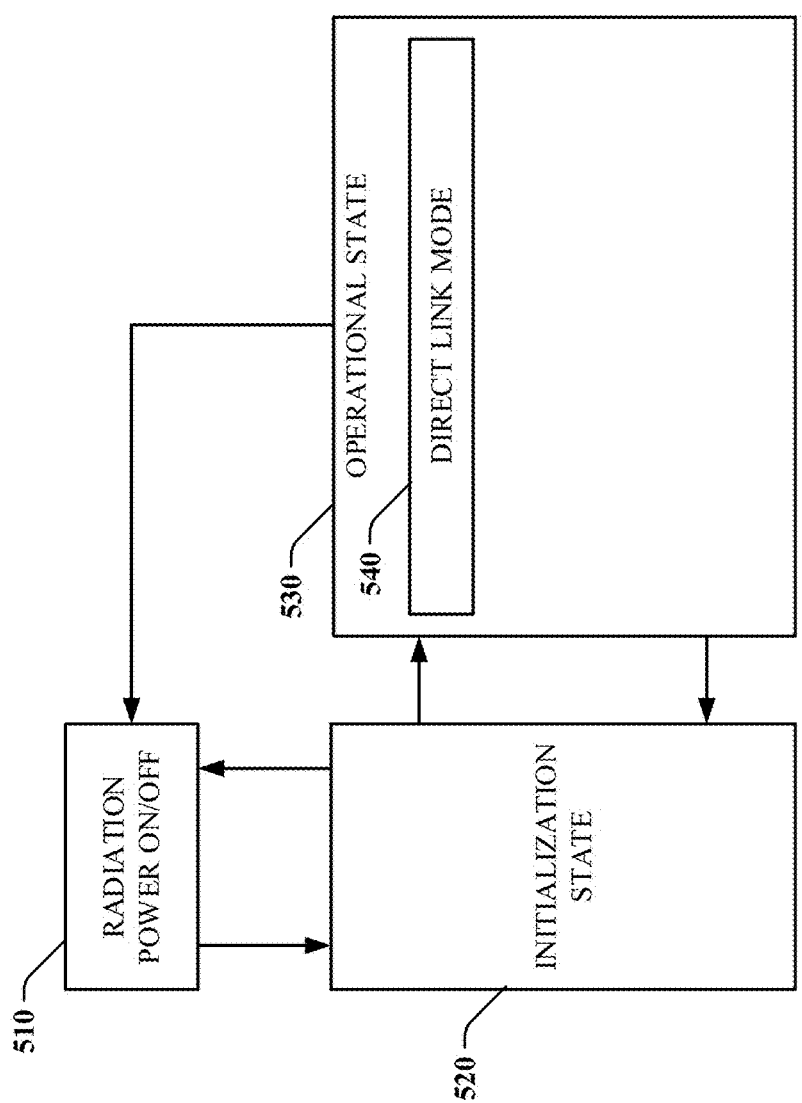
FIG. 5 illustrates a block diagram of exemplary non-limiting states of a type I small cell device.

In a type I small cell device 310, there is a single mode in operation state of direct link mode. For example referring to FIG. 5, is depicted states of a type I small cell device 310. In radiation power on/off state 510, small cell device can control radio frequency components to turn on or off radiation power on one or more frequencies. In initialization state 520, such as from transitioning from radiation power on/off state 510, small cell device can determine operational parameters for communication on the cellular communication network, such as in a non-limiting example, frequency subcarriers to employ and radiation power level for its radio antennae. In operational state 530, such as from transitioning from initialization state 520, small cell device can only operate in direct link mode 540 as discussed above with respect to direct link mode. Advantageously, a type I small cell device is easy to implement and mitigates interference with neighboring small cell devices 310 and macro base stations 370 in view of no control information being broadcast in direct link mode. Given, that user equipment 360 that are not in a direct link with small cell device 310 will not be able to discover small cell device 310, a type I small cell device 310 can be more appropriate for an area where macro base station has 100% coverage, such as in a non-limiting example, areas geographically close (e.g. within a predefined distance) to macro base station 370.

Figure 6:
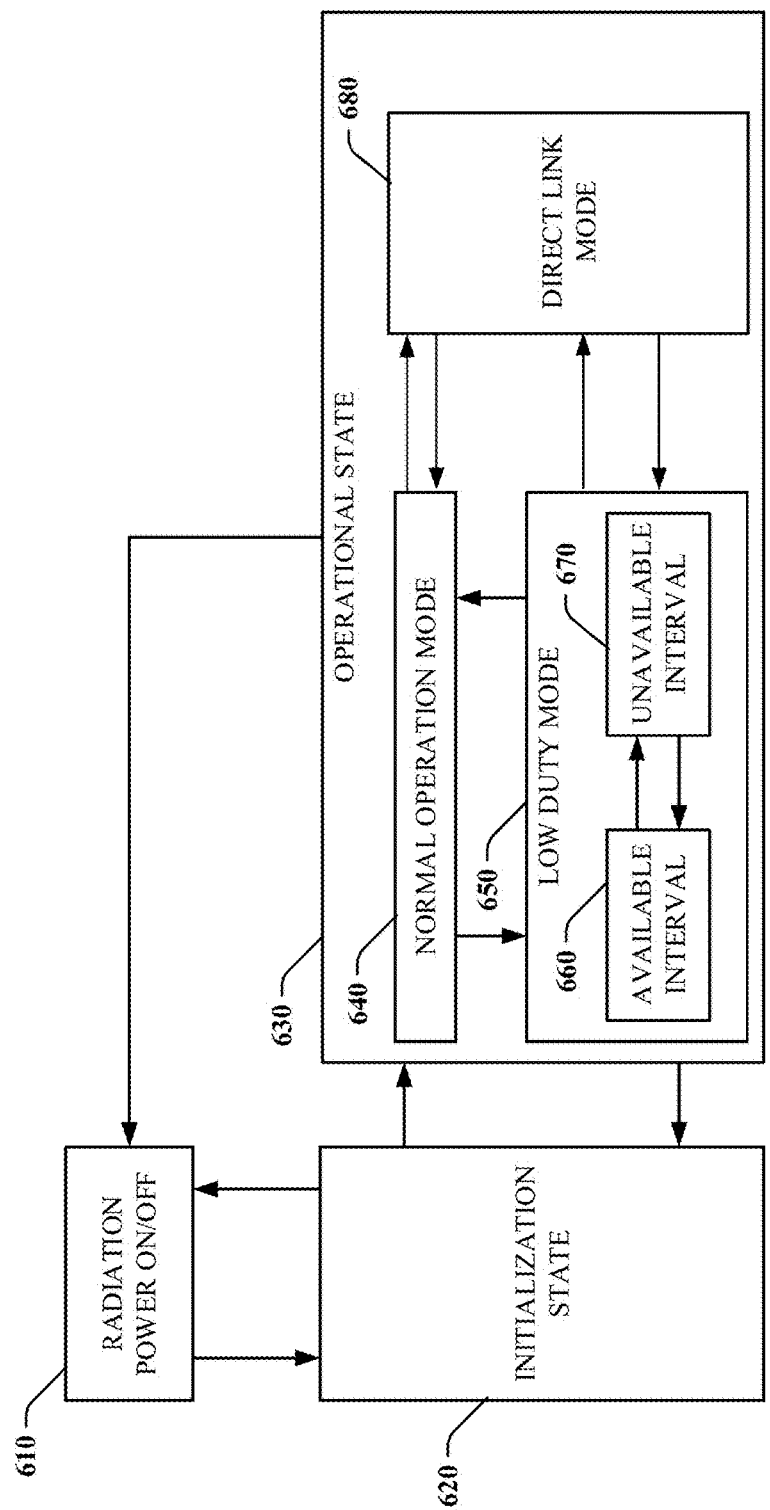
FIG. 6 illustrates a block diagram of exemplary non-limiting states of a type II small cell device.

In a type II small cell device 310, there are modes in operation state of direct link mode, normal operation mode, and low duty mode. For example referring to FIG. 6, is depicted states of a type II small cell device 310. In radiation power on/off state 610, small cell device can control radio frequency components to turn on or off radiation power on one or more frequencies. In initialization state 620, such as from transitioning from radiation power on/off state 610, small cell device can determine operational parameters for communication on the cellular communication network, such as in a non-limiting example, frequency subcarriers to employ and radiation power level for its radio antennae. In operational state 630, such as from transitioning from initialization state 620, small cell device can operate in three modes, normal operation mode 640, low duty mode 650, and direct link mode 680. In normal operation mode 640, small cell device operates as a macro base station with a smaller cell coverage area. In low duty mode 650, small cell device turns off or reduces radiation power of its radio antennae periodically or aperiodically to decrease interference with neighboring small cell devices or macro base stations, where available interval state 660 does not have the radiation power reduced or turned off, and unavailable interval state 670 has the radiation power reduced or turned off. Direct link mode 680 is as discussed above with respect to direct link mode. It is to be appreciated that small cell device 310 can transition between states and modes as needed according to any suitable switching criteria or algorithm. In a non-limiting example, switching criteria for transitioning between direct link mode and normal operation mode or low duty mode can include a number of active user equipment 360 in communication with small cell device 310 meeting a threshold, a number of active user equipment 360 within a geographic area meeting a threshold, number or frequency of communications on a direct link meeting a threshold, a radio link failure report from user equipment 360 in direct link with small cell device 310, at a predefined or dynamically determined interval. It is to be appreciated that a decision to change mode in an operation state for a small cell device 310 can be made by small cell device 310 or macro base station 370.

Figure 7:
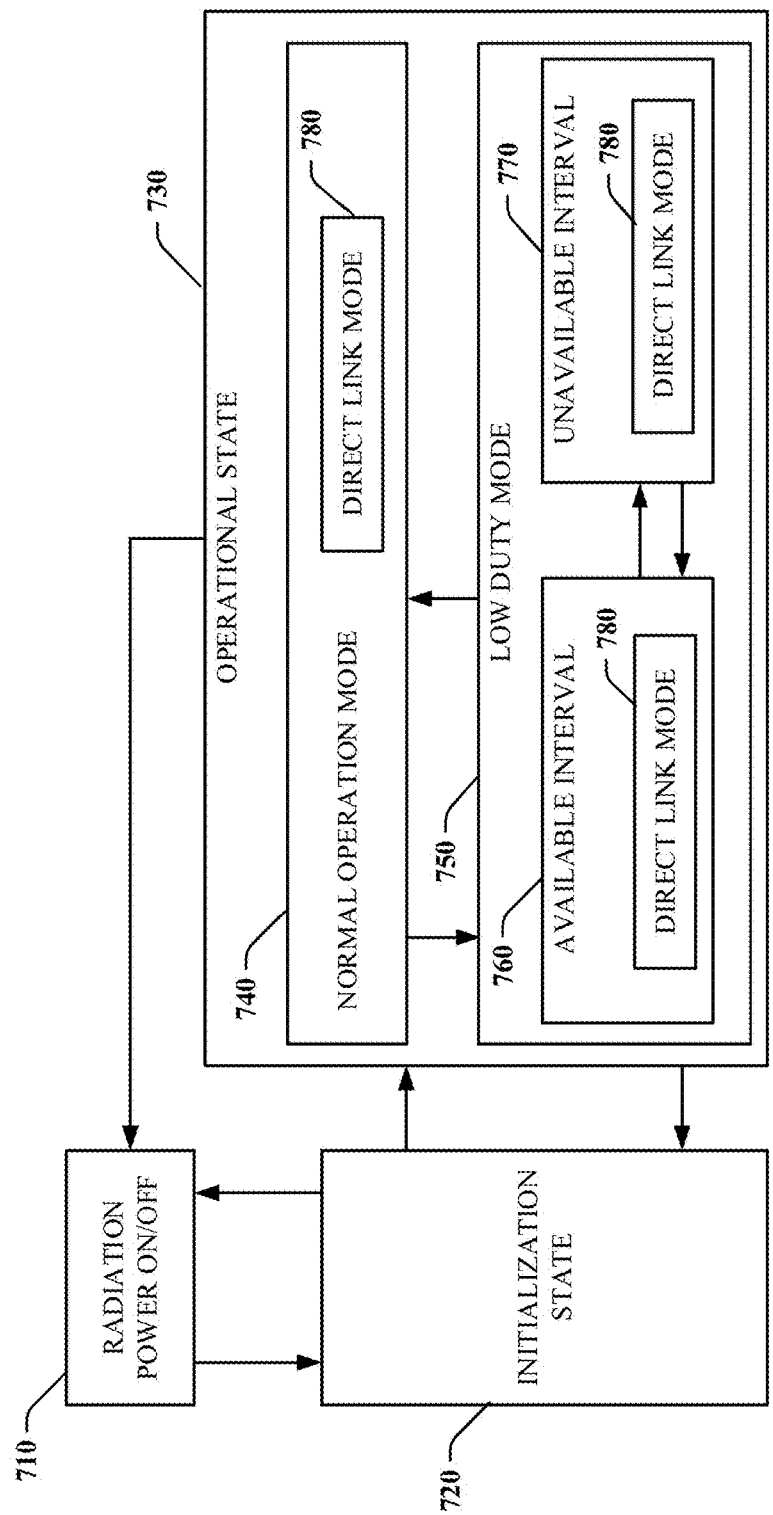
FIG. 7 illustrates a block diagram of exemplary non-limiting states of a type III small cell device.

In a type III small cell device 310, there are modes in operation state of direct link mode concurrent with normal operation mode or low duty mode. For example referring to FIG. 7, is depicted states of a type III small cell device 310. In radiation power on/off state 710, small cell device can control radio frequency components to turn on or off radiation power on one or more frequencies. In initialization state 720, such as from transitioning from radiation power on/off state 710, small cell device can determine operational parameters for communication on the cellular communication network, such as in a non-limiting example, frequency subcarriers to employ and radiation power level for its radio antennae. In operational state 730, such as from transitioning from initialization state 720, small cell device can operate in two modes, normal operation mode 740 and low duty mode 750, while concurrently operating in direct link mode 780. In normal operation mode 740, small cell device operates as a macro base station with a smaller cell coverage area, however while concurrently operating in direct link mode 780. In low duty mode 650, small cell device turns off or reduces radiation power of its radio antennae periodically or aperiodically to decrease interference with neighboring small cell devices or macro base stations, where available interval state 660 does not have the radiation power reduced or turned off, and unavailable interval state 670 has the radiation power reduced or turned off. In normal operation mode 740, small cell device, concurrently operates in direct link mode 780. Direct link mode 780 is as discussed above with respect to direct link mode. It is to be appreciated that small cell device 310 can transition between states and modes as needed according to any suitable switching criteria or algorithm.

Figure 8:
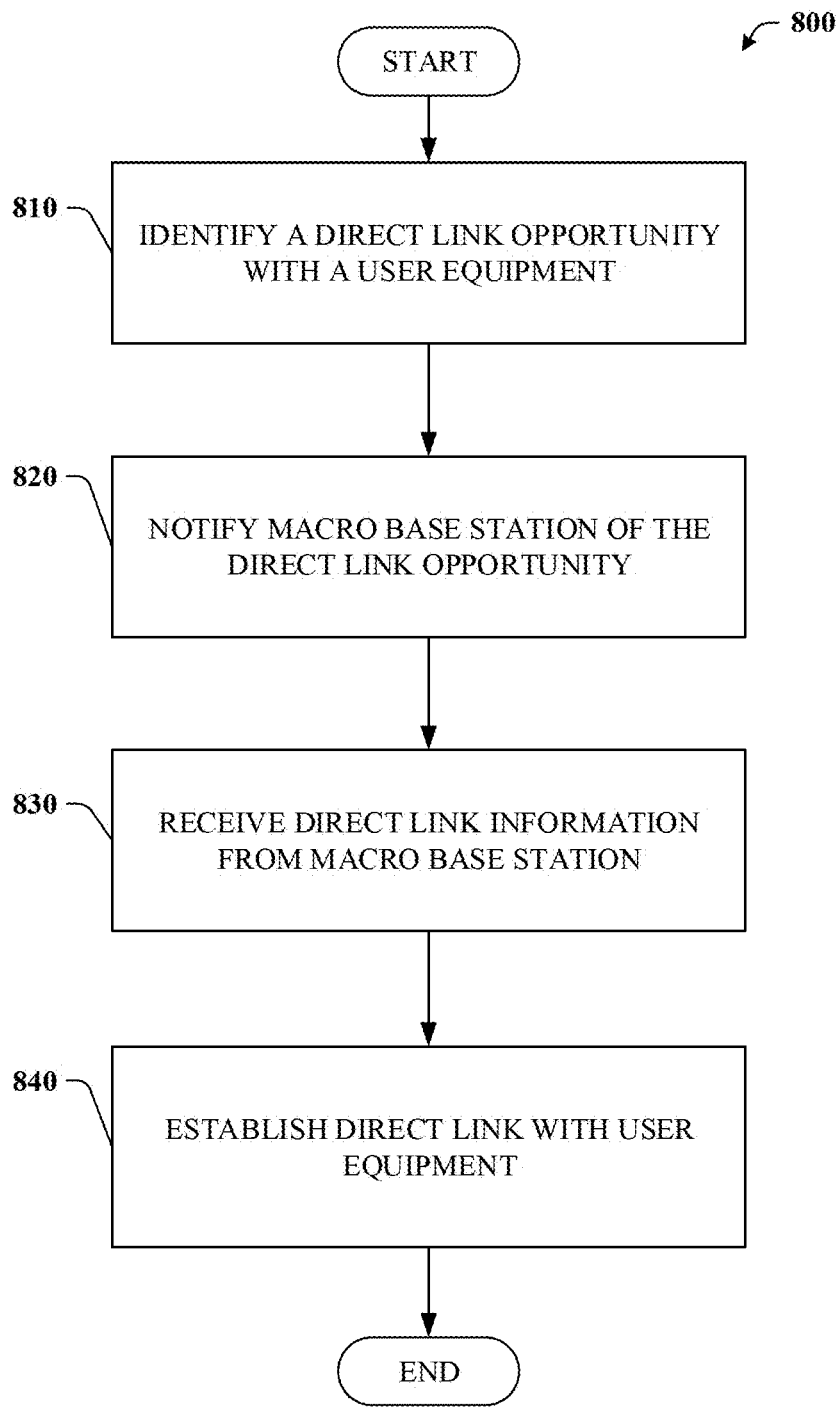
FIG. 8 illustrates an exemplary non-limiting flow diagram for a small cell device to establish a direct link mode connection between the small cell device and a user equipment in accordance with an implementation of this disclosure.
Figure 9:
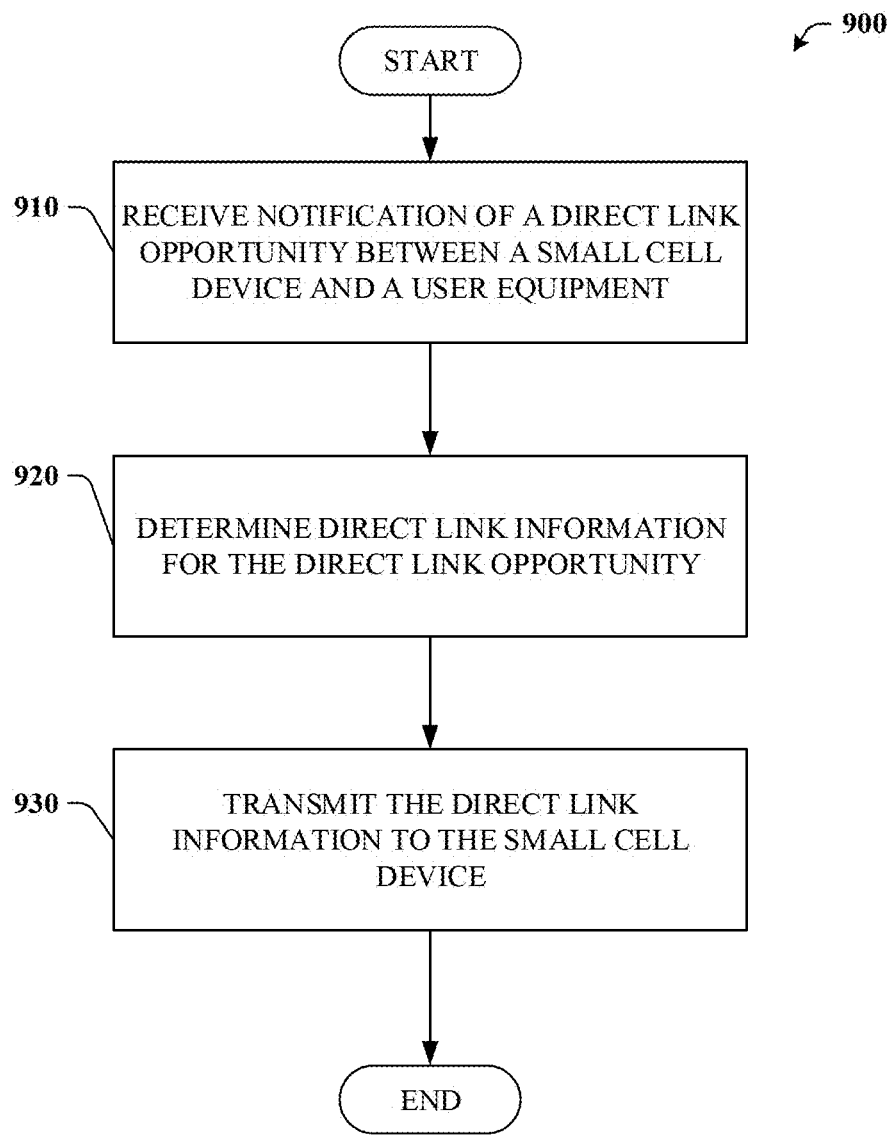
FIG. 9 illustrates an exemplary non-limiting flow diagram for a macro base station to generate direct link information to establish a direct link mode connection between a small cell device and a user equipment in accordance with an implementation of this disclosure.

FIGS. 8-9 illustrate various methods in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Referring to FIG. 8, is depicted an exemplary method 800 for a small cell device to establish a direct link mode connection between the small cell device and a user equipment. At reference numeral 810, a direct link opportunity between the small cell device and the user equipment is identified by monitoring uplink radio frames from one or more user equipment to a macro base station (e.g., by a listening component 320 or small cell device 310). At reference numeral 820, the macro base station is notified of the direct link opportunity between the small cell device and the user equipment (e.g., by a direct link mode component 330, interface component 340, or small cell device 310). At reference numeral 830, direct link information for establishing a direct link between the small cell device and the user equipment is received from the macro base station (e.g., by a direct link mode component 330, interface component 340, or small cell device 310). At reference numeral 830, a direct link between the small cell device and the user equipment is established using the direct link information (e.g., by a direct link mode component 330, interface component 340, or small cell device 310).

Referring to FIG. 9, is depicted an exemplary method 900 for a macro base station to generate direct link information to establish a direct link mode connection between a small cell device and a user equipment. At reference numeral 910, a direct link opportunity between the small cell device and the user equipment is received from the small cell device (e.g., by a macro base station 370). At reference numeral 920, the direct link information for establishing the direct link between the small cell device and the user equipment is determined (e.g., by macro base station 370). At reference numeral 930, the direct link information is transmitted to the small cell device, and optionally to the user equipment (e.g., by macro base station 370).

Figure 10:
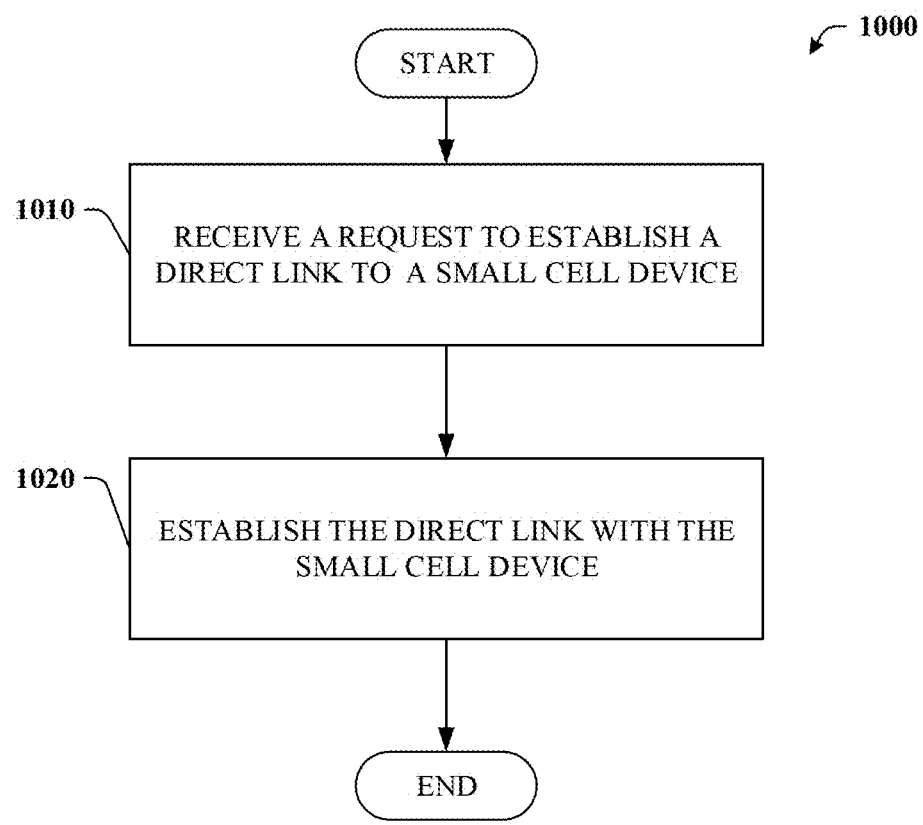
FIG. 10 illustrates an exemplary non-limiting flow diagram for a user equipment to establish a direct link to a small cell device in accordance with an implementation of this disclosure

Referring to FIG. 10, is depicted an exemplary method 1100 for a user equipment to establish a direct link to a small cell device. At reference numeral 1010, a request to establish a direct link is received from the small cell device (e.g., by a user equipment 360). At reference numeral 1020, a direct link is established with the small cell device (e.g., by user equipment 360).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 11:
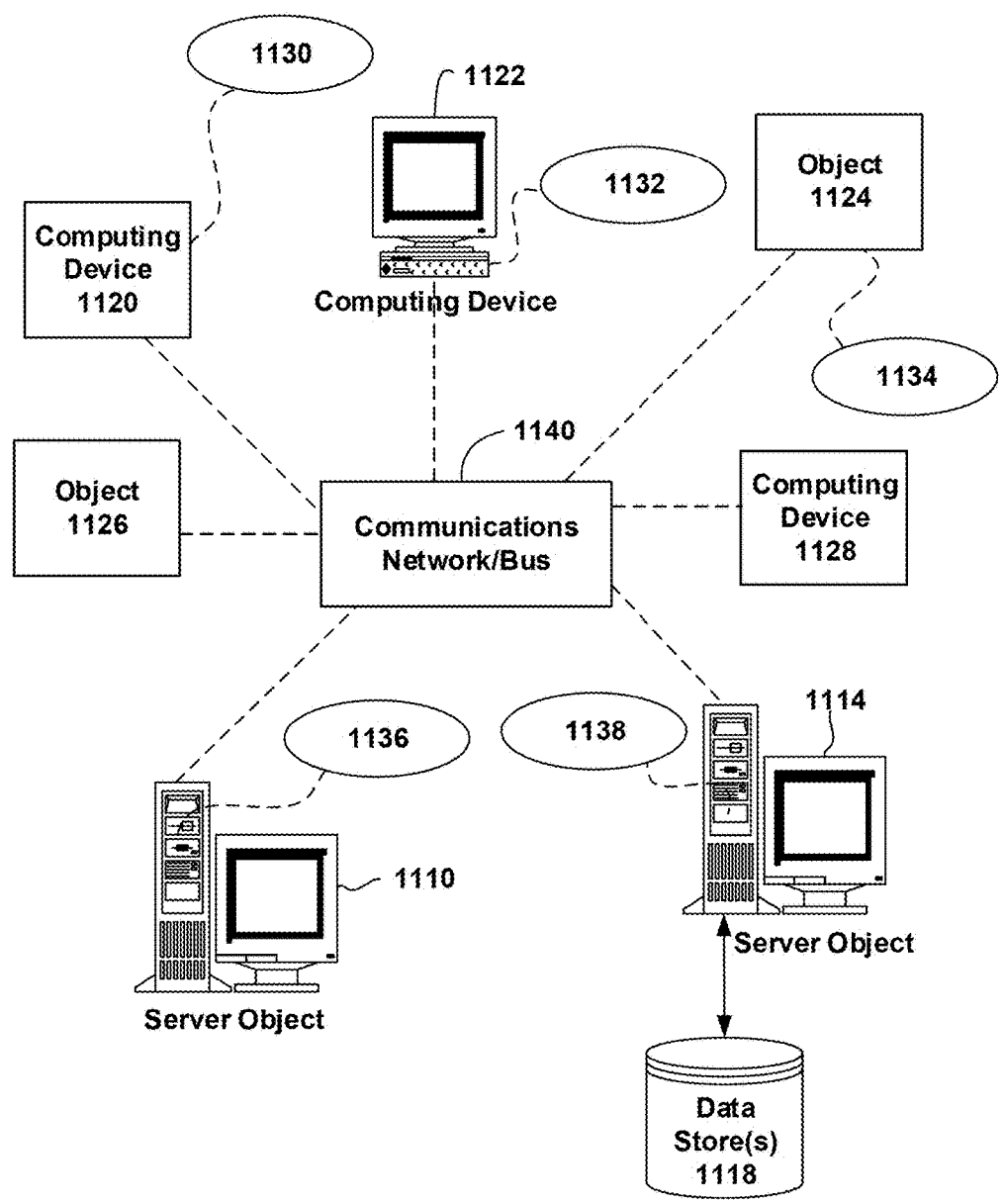
FIG. 11 illustrates a block diagram of an exemplary non-limiting networked environment in which various embodiments can be implemented.

FIG. 11 provides a schematic diagram of an exemplary networked or distributed computing environment. The distributed computing environment comprises computing objects 1110, 1114, etc. and computing objects or devices 1118, 1120, 1122, 1124, 1126, 1128, etc., which may include programs, methods, data stores, programmable logic, etc., as represented by applications 1130, 1132, 1134, 1136, 1138. It can be appreciated that computing objects 1110, 1114, etc. and computing objects or devices 1118, 1120, 1122, 1124, 1126, 1128, etc. may comprise different devices, such as personal digital assistants (PDAs), audio/video devices, mobile phones, MP3 players, personal computers, laptops, tablets, etc.

Each computing object 1110, 1114, etc. and computing objects or devices 1118, 1120, 1122, 1124, 1126, 1128, etc. can communicate with one or more other computing objects 1110, 1114, etc. and computing objects or devices 1118, 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each computing object 1110, 1114, etc. or computing objects or devices 1118, 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 11, as a non-limiting example, computing objects or devices 1118, 1120, 1122, 1124, 1126, 1128, etc. can be thought of as clients and computing objects 1110, 1114, etc. can be thought of as servers where computing objects 1110, 1114, etc. provide data services, such as receiving data from client computing objects or devices 1118, 1120, 1122, 1124, 1126, 1128, etc., storing of data, processing of data, transmitting data to client computing objects or devices 1118, 1120, 1122, 1124, 1126, 1128, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1140 is the Internet, for example, the computing objects 1110, 1112, etc. can be Web servers, file servers, media servers, etc. with which the client computing objects or devices 1118, 1120, 1122, 1124, 1126, 1128, etc. communicate via any of a number of known protocols, such as the hypertext transfer protocol (HTTP). Objects 1110, 1112, etc. may also serve as client computing objects or devices 1118, 1120, 1122, 1124, 1126, 1128, etc., as may be characteristic of a distributed computing environment.

Exemplary Computing Device

Figure 12:
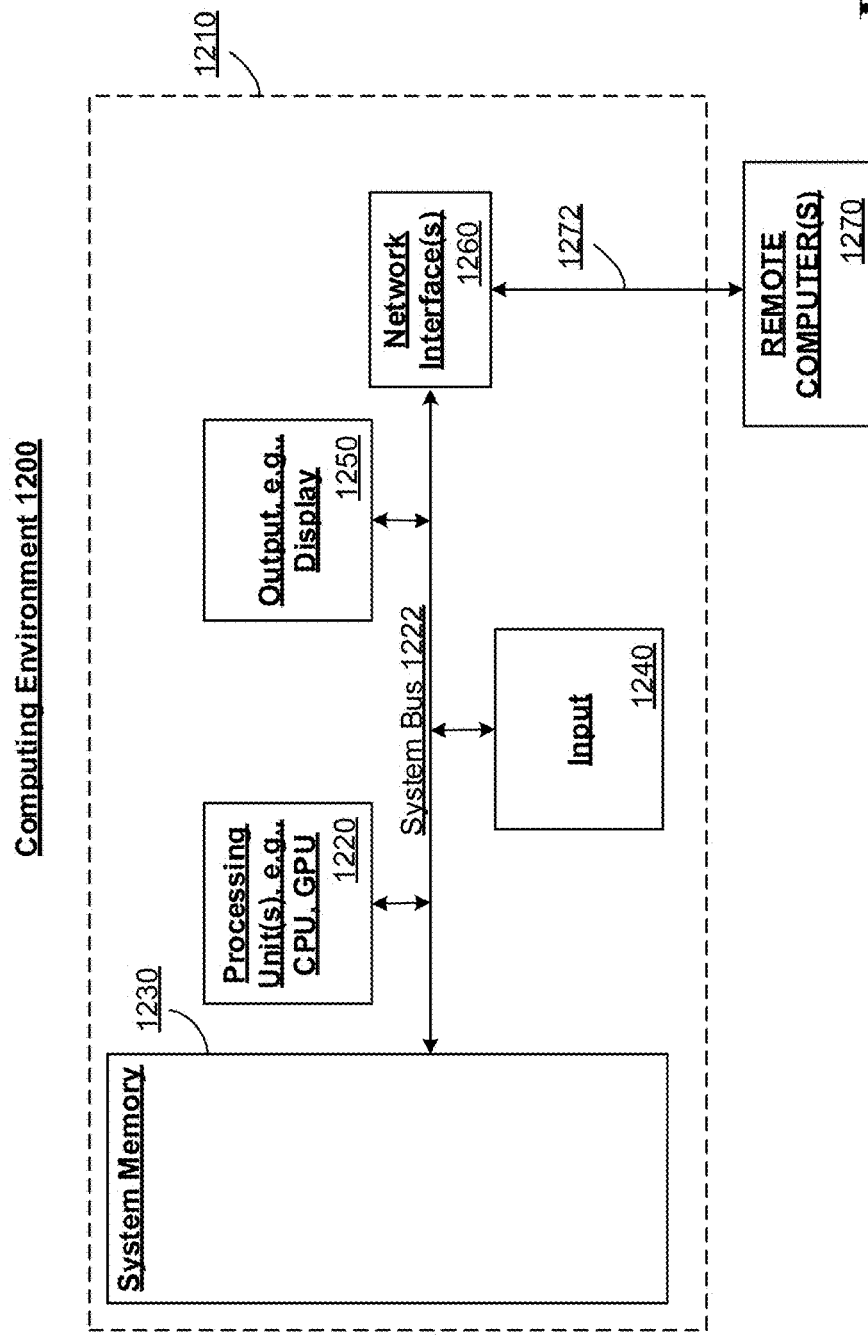
FIG. 12 illustrates a block diagram of an exemplary non-limiting computing system or operating environment in which various embodiments can be implemented.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 12 is but one example of a computing device that can be employed with implementing one or more of the systems or methods shown and described in connection with FIGS. 1-10. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing environment 1200 be interpreted as having any dependency or requirement relating to any one or combination of components illustrated in the exemplary operating environment 1200.

With reference to FIG. 12, an exemplary computing device for implementing one or more embodiments in the form of a computer 1210 is depicted. Components of computer 1210 may include, but are not limited to, a processing unit 1220, a system memory 1230, and a system bus 1222 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data.

A user can enter commands and information into the computer 1210 through input devices 1240, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1210. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270 via network interface 1260. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:
identifying, by a small cell device, an opportunity to connect with a user equipment using a direct link mode by monitoring uplink radio frames from the user equipment to a macro base station device;
in response to identifying the opportunity to connect with the user equipment using the direct link mode,
notifying, by the small cell device, the macro base station device of the opportunity to connect with the user equipment using the direct link mode;
receiving, by the small cell device, direct link information for the user equipment from the macro base station device;
participating in, by the small cell device, establishment of a direct link with the user equipment based on the direct link information;
ceasing, by the small cell device, any broadcast of control information from the small cell device during the direct link; and
selectively operating the small cell device in one of the direct link mode in which the small cell device does not broadcast the control information, a low-duty mode in which a radiation power of a radio antennae is limited, and a normal operation mode in which the small cell device operates as a macro base station, wherein the small cell device is configured to switch from the direct link mode to the low-duty mode based on a radio link failure report from the user equipment.

2. The method of claim 1, wherein the identifying the opportunity to connect with the user equipment using the direct link mode comprises detecting a received signal strength of the user equipment above a threshold value, and wherein the small cell device selectively transitions among the direct link mode, the low-duty mode, and the normal operation mode based on one or more of a number of active user equipment in communication with the small cell device, a number of active user equipment within a geographic area, a number or frequency of communications on the direct link, and the radio link failure report from the user equipment.

3. The method of claim 1, wherein the direct link information comprises identification information associated with the user equipment, wherein the low-duty mode comprises an available interval state in which the radiation power of the radio antennae is not reduced and an unavailable interval state in which the radiation power of the radio antennae is reduced.

4. The method of claim 1, wherein the direct link information comprises assignment information representing an assignment of one or more radio resources to the small cell device and the user equipment within a macro cell coverage area associated with the macro base station device.

5. The method of claim 4, wherein at least one radio resource of the one or more radio resources is concurrently assigned to at least one other small cell device and at least one other user equipment, wherein the at least one other small cell device and the at least one other user equipment are within the macro cell coverage area and operate outside of a threshold geographical distance from the small cell device and the user equipment.

6. The method of claim 1, further comprising transmitting, by the small cell device, control signaling information attached to data packets directed to the user equipment, and wherein the small cell device is operated in the normal operation mode and the direct link mode concurrently.

7. The method of claim 1, wherein the uplink radio frames are associated with at least one of an uplink data channel, an uplink control channel, or an uplink reference signal.

8. A non-transitory computer-readable storage device having instructions stored thereon that, in response to execution, cause a small cell device including a processor to perform operations comprising:
identifying an opportunity to connect with a user equipment using a direct link mode by monitoring uplink radio frames from the user equipment to a macro base station device;
in response to identifying the opportunity to connect with the user equipment using the direct link mode:
notifying the macro base station device of the opportunity to connect with the user equipment using the direct link mode;
receiving direct link information for the user equipment from the macro base station device;
participating in establishment of a direct link with the user equipment based on direct link information; and
limiting a broadcast of control information from the small cell device during the direct link to reduce interference with other devices, and
selectively operating the small cell device in one of the direct link mode in which the small cell device does not broadcast the control information, a low-duty mode in which a radiation power of a radio antennae is limited, and a normal operation mode in which the small cell device operates as a macro base station, wherein the small cell device is configured to switch from the direct link mode to the low-duty mode based on a radio link failure report from the user equipment.

9. The non-transitory computer-readable storage device of claim 8, wherein the identifying the opportunity to connect with the user equipment using the direct link mode comprises detecting a received signal strength of the user equipment above a threshold signal strength.

10. The non-transitory computer-readable storage device of claim 8, wherein the direct link information comprises identification information associated with the user equipment.

11. The non-transitory computer-readable storage device of claim 8, wherein the direct link information comprises assignment information representing an assignment of one or more radio resources to the small cell device and the user equipment within a macro cell coverage area associated with the macro base station device.

12. The non-transitory computer-readable storage device of claim 11, wherein at least one radio resource of the one or more radio resources is concurrently assigned to at least one other small cell device and at least one other user equipment, wherein the at least one other small cell device and the at least one other user equipment are within the macro cell coverage area and operate outside of a geographical threshold distance from the small cell device and the user equipment.

13. The non-transitory computer-readable storage device of claim 8, wherein the operations further comprise transmitting, by the small cell device, control signaling information attached to one or more data packets directed to the user equipment.

14. The non-transitory computer-readable storage device of claim 8, wherein the small cell device during the direct link does not broadcast control information on a channel employed by the macro base station device to broadcast control information.

15. A small cell device, comprising:
a listening component configured to identify an opportunity to connect with a user equipment using a direct link mode by monitoring uplink radio frames from the user equipment to a macro base station device; and
a direct link mode component configured to, in response to identification of the opportunity to connect with the user equipment using the direct link mode,
notify the macro base station device of the opportunity to connect with the user equipment using the direct link mode,
receive direct link information for the user equipment from the macro base station device,
participate in establishment of a direct link with the user equipment based on the direct link information, and
limit a broadcast of control information from the small cell device during the direct link to reduce interference with other devices,
wherein the small cell device selectively operates in one of the direct link mode in which the small cell device does not broadcast the control information, one of a normal operation mode in which the small cell device operates as a macro base station, and a low-duty mode in which a radiation power of a radio antennae is limited, wherein, decided by the macro base station device, the small cell device is configured to switch between the normal operation mode and the low-duty mode while remaining concurrently in the direct link with the user equipment, and wherein the small cell device is configured to switch from the direct link mode to the low-duty mode based on a radio link failure report from the user equipment.

16. The small cell device of claim 15, wherein the listening component is further configured to identify the opportunity to connect with the user equipment using the direct link mode based upon detection of a received signal strength of the user equipment above a threshold signal strength.

17. The small cell device of claim 15, wherein the direct link information comprises identification information associated with the user equipment.

18. The small cell device of claim 15, wherein the direct link information identifies an assignment of one or more radio resources to a pair, comprising the small cell device and the user equipment, within a macro cell coverage area associated with the macro base station device.

19. The small cell device of claim 18, wherein at least one radio resource of the one or more radio resources is concurrently assigned to at least one other pair, comprising at least one other small cell device and at least one other user equipment, within the macro cell coverage area and operating outside of a geographical threshold distance from the pair.

20. The small cell device of claim 15, wherein the direct link mode component is further configured to transmit control signaling information included with one or more data packets directed to the user equipment.

21. The small cell device of claim 15, wherein the small cell device during the direct link does not broadcast control information.

22. A method, comprising:
identifying, by a small cell device, an opportunity to connect with a user equipment using a direct link mode by monitoring uplink radio frames from the user equipment to a macro base station device;
receiving, by the macro base station device from the small cell device, notification of the opportunity to form a direct link with the user equipment;
transmitting, by the macro base station device to the small cell device, direct link information that assists the user equipment and the small cell device to identify each other and establish the direct link;
assigning, by the macro base station device to the small cell device and the user equipment, radio resources based on a geographic distance threshold from the small cell device to an adjacent small cell device;
participating in, by the small cell device, establishment of the direct link with the user equipment based on the direct link information;
limiting, by the small cell device, a broadcast of control information from the small cell device during the direct link to reduce interference with other devices; and
selectively operating the small cell device in one of the direct link mode in which the small cell device does not broadcast the control information, a low-duty mode in which a radiation power of a radio antennae is limited, and a normal operation mode in which the small cell device operates as a macro base station, wherein the small cell device is configured to switch from the direct link mode to the low-duty mode based on a radio link failure report from the user equipment.

23. The method of claim 22, wherein the direct link information comprises identification information associated with the user equipment.

24. The method of claim 22, wherein the direct link information comprises assignment data representing an assignment of at least one radio resource to a pair, comprising the small cell device and the user equipment within a macro cell coverage area associated with the macro base station device.

25. The method of claim 24, further comprising:
identifying, by the macro base station device, a radio resource currently assigned to at least one other pair comprising at least one other small cell device and at least one other user equipment within the macro cell coverage and operating outside of a geographical threshold distance from the pair; and
including, by the macro base station device, the radio resource in the assignment of the at least one radio resource to the pair.

* * * * *